B. J. O'NEILL.
Machine for Planting Seed Potatoes.
No. 233,635. Patented Oct. 26, 1880.
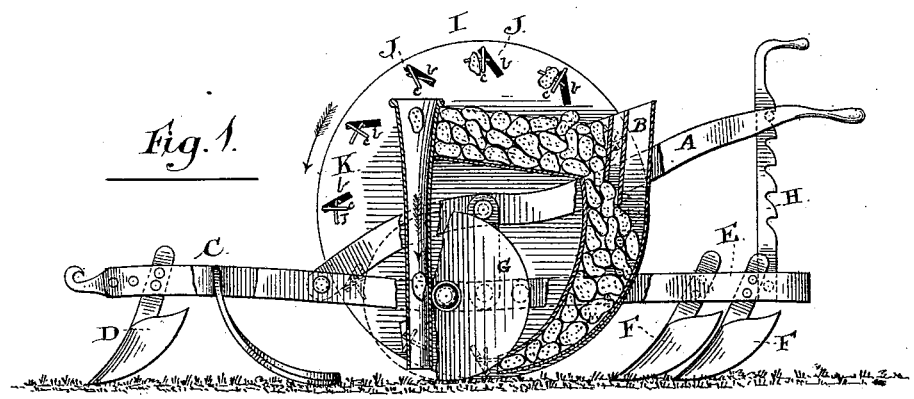
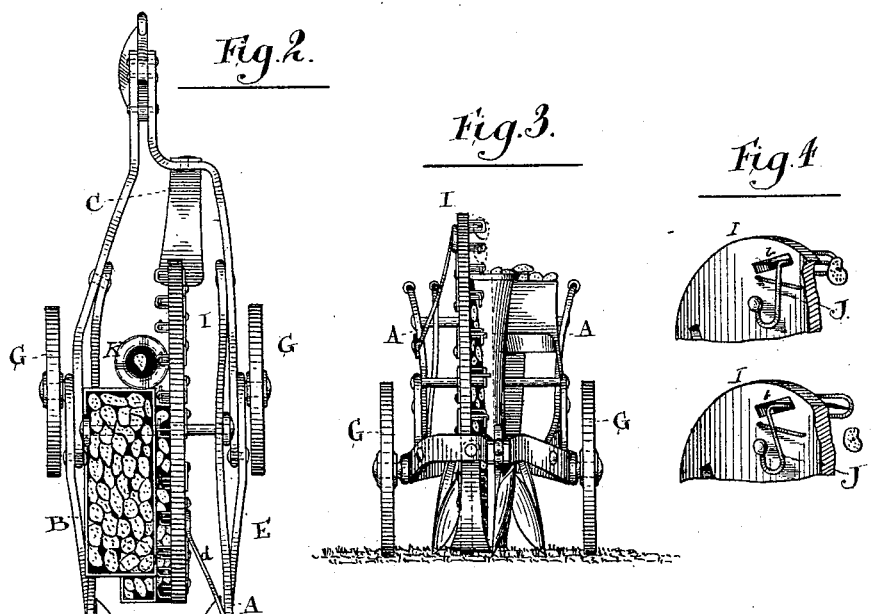
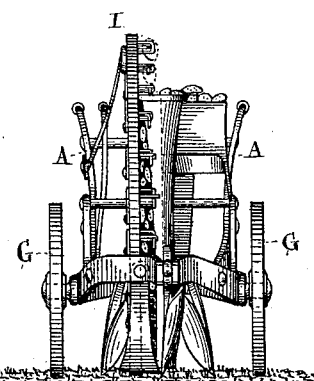
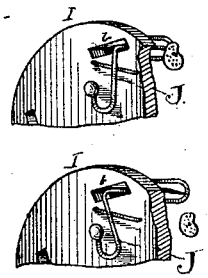
Witnesses:
Louis M. Whitehead
John H. Elliot
Inventor:
B. J. O'Neill
by Ridout Airdlie
Att'ys

UNITED STATES PATENT OFFICE.

BARTHOLOMEW J. O'NEILL, OF UXBRIDGE, ONTARIO, CANADA.

MACHINE FOR PLANTING SEED-POTATOES.

SPECIFICATION forming part of Letters Patent No. 233,635, dated October 26, 1880.

Application filed January 20, 1880.

*To all whom it may concern:*

Be it known that I, BARTHOLOMEW JOSEPH O'NEILL, of the town of Uxbridge, in the county of Ontario and Province of Ontario, Canada, have invented a certain new and useful Machine for Planting Seed-Potatoes, which improvement is fully set forth in the following specification and accompanying drawings, like letters of reference indicating corresponding parts in each figure.

The object of the invention is to provide a combined machine that will make the furrow, deposit the potatoes therein at regular distances apart, and cover up the potatoes when in place; and it consists of plowshares arranged on an adjustable frame supporting a potato-reservoir, and provided with a revolving disk having pointed hooks and staples so arranged that they each remove a single potato from the reservoir at every revolution of the disk and drop it into a chute, which conveys it to the furrow, where it is covered by the action of covering-plows, also attached to the frame, as hereinafter more particularly described.

In the accompanying drawings, Figure 1 is a side view. Fig. 2 is a plan view. Fig. 3 is an end view; Fig. 4, detail views of a part of the slotted planting-wheel with its spring-hooks.

As shown by the drawings, the frame is composed of three parts. The part marked A forms the handles and supports the potato hopper or reservoir B. C constitutes the front of the machine, where the horse is attached, and to which the plow D is secured. The rear part, E, is pivoted to C, supports the coverers F and side wheels, G. The notched bar H is pivoted to the frame E, and is arranged to fit over the hind rail, $a$, connecting the handles together; or some other suitable catch might be provided for the purpose of holding the bar H, and by it adjusting the frame E, so that the wheels G can be raised clear of the ground to permit the plow to act, or vice versa, as required.

I represents a large flat wheel or disk running in rear of the plow D, which makes the opening furrow to receive the seed-potatoes. The wheel I is journaled in uprights secured to the frame C and the handles, and is the driving-wheel of the machine. The driving-wheel I is provided with inclined slots $b$ near its circumference and extending around the wheel at regular intervals, the distance between the slots being the distance apart between the seed-potatoes in the furrow. To the back of the wheel I are secured, at their ends, the spring-hooks J, one for each slot, which pass each through its slot, and are then bent forward, and each passes through the opening in a staple, $c$. Each of these staples straddles the bent pointed end of the spring-hook, for purposes hereinafter explained.

B is a potato-hopper, having an inclined spout leading down into the opening furrow made by the plow D, the hopper being supported by the handles A, and having its inner side made open, but closed by the face of the driving-wheel I.

K represents a chute for conveying the potatoes to the furrow, and is attached at its upper end to the hopper in close proximity to the driving-wheel I, so as to receive and convey the seed-potatoes to the furrow after they have been forced from the spring-hook. $d$ (see Fig. 2) represents a bar secured at one end to one of the handles, its opposite end bearing against the outer face of the wheel I, so that in the revolution of the wheel I the upper end of the bar $d$ will retract each spring-catch successively and discharge the seed-potatoes into the chute K.

The functions of the staples $c$ straddling the pointed ends of the spring-hooks are twofold, viz: In entering the hopper the staple, in its backward and upward movement with the wheel I, supports or holds a seed-potato while the pointed end of the spring-hook J enters it, and when the potato has been carried around over the conveyer-chute K and the spring-hook is acted upon by the bar $d$ the staple holds the potato in place while the pointed end of the spring-hook is drawn out of it.

Heretofore in potato-planters revolving hooks, each piercing and carrying a seed-potato, or part of one, to a chute leading into a furrow made by a plow, have been employed, and such revolving hooks have also been used in conjunction with lever-trips operated by a cam to knock the seed-potato off the point of the hook when it has been carried over the mouth of the chute, and I therefore lay no claim, broadly, to conveying seed-potatoes from a hopper to a chute by hooks and removing them from said hooks by a trip, my invention being confined to the particular construction and arrangement of parts shown.

What I claim as new, and desire to secure by Letters Patent, is—

1. In a potato-planter, the combination of the driving-wheel I, provided with the spaced slots $d$, of the spring-hooks J, and staples $c$, straddling said spring-hooks, substantially as described.

2. The combination of the slotted wheel I, spring-hooks J, and staples $c$ with the bar $d$ and chute K, substantially as described, and for the purpose set forth.

3. The combination, with the slotted driving-wheel I, spring-hooks J, staples $c$, and bar $d$, of the chute K and hopper B, substantially as described, and for the purpose set forth.

4. In a potato-planter, the combination, with the adjustable frame E, carrying the side wheels, G, of the frame C, having its rear ends pivoted to the frame E, handles A, driving-wheels I, hopper B, and pivoted notched bar H, engaging with the round $a$, substantially as described, and for the purpose set forth.

B. J. O'NEILL.

Witnesses:
A. H. WHELER,
L. SMELT.